(12) United States Patent
Kondo

(10) Patent No.: US 8,411,945 B2
(45) Date of Patent: Apr. 2, 2013

(54) IMAGE PROCESSING DEVICE

(75) Inventor: Masaki Kondo, Toyoake (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 577 days.

(21) Appl. No.: 12/647,161

(22) Filed: Dec. 24, 2009

(65) Prior Publication Data

US 2010/0166336 A1 Jul. 1, 2010

(30) Foreign Application Priority Data

Dec. 25, 2008 (JP) .................................. 2008-330453

(51) Int. Cl.
*G06K 9/00* (2006.01)

(52) U.S. Cl. ........................................ 382/167; 358/520

(58) Field of Classification Search ........... 382/162–167
See application file for complete search history.

(56) References Cited

U.S. PATENT DOCUMENTS

| | | | |
|---|---|---|---|
| 5,289,295 A | 2/1994 | Yumiba et al. | |
| 5,710,872 A | 1/1998 | Takahashi et al. | |
| 7,116,443 B2 * | 10/2006 | Handley et al. | 358/1.9 |
| 7,379,204 B2 | 5/2008 | Kukao | |
| 7,545,533 B2 * | 6/2009 | Ok et al. | 358/1.9 |
| 2002/0114513 A1 * | 8/2002 | Hirao | 382/167 |
| 2002/0126302 A1 | 9/2002 | Fukao | |
| 2004/0017550 A1 | 1/2004 | Yasumi | |
| 2004/0057614 A1 | 3/2004 | Ogatsu et al. | |
| 2004/0151370 A1 | 8/2004 | Saski | |
| 2004/0156544 A1 | 8/2004 | Kajihara | |
| 2004/0165769 A1 * | 8/2004 | Huh et al. | 382/162 |
| 2004/0240749 A1 | 12/2004 | Miwa et al. | |
| 2006/0222242 A1 | 10/2006 | Hayaishi | |
| 2006/0232801 A1 * | 10/2006 | Hoshii | 358/1.9 |
| 2007/0296986 A1 | 12/2007 | Watanabe et al. | |
| 2008/0174796 A1 * | 7/2008 | Yoo | 358/1.9 |
| 2008/0231921 A1 | 9/2008 | Dokuni | |
| 2008/0304739 A1 | 12/2008 | Sasaki | |
| 2009/0002738 A1 | 1/2009 | Kondo et al. | |
| 2009/0009525 A1 | 1/2009 | Hirashima et al. | |

(Continued)

FOREIGN PATENT DOCUMENTS

| | | |
|---|---|---|
| JP | H05-300531 | 11/1993 |
| JP | 8-321957 | 12/1996 |

(Continued)

OTHER PUBLICATIONS

United States Office Action dated Dec. 3, 2012 from related U.S. Appl. No. 12/647,164.

(Continued)

*Primary Examiner* — Jingge Wu
(74) *Attorney, Agent, or Firm* — Scully, Scott, Murphy & Presser, P.C.

(57) ABSTRACT

An image processing device may create corrected image data by correcting object image data utilizing base image data. The image processing device may determine a first representative value which represents first pixels having a higher brightness value among entire pixels of the object image data, determine a second representative value which represents second pixels having a higher brightness value among entire pixels of the base image data, and create the corrected image data by correcting a value of each pixel of the object image data such that the first representative value approaches the second representative value.

9 Claims, 8 Drawing Sheets

U.S. PATENT DOCUMENTS

| | | | |
|---|---|---|---|
| 2009/0060326 A1* | 3/2009 | Imai et al. | 382/167 |
| 2009/0092297 A1 | 4/2009 | Kitoh | |
| 2009/0103805 A1 | 4/2009 | Huang | |
| 2009/0116740 A1* | 5/2009 | Li et al. | 382/167 |
| 2011/0182507 A1 | 7/2011 | Free | |

FOREIGN PATENT DOCUMENTS

| | | |
|---|---|---|
| JP | H09-326941 | 12/1997 |
| JP | 10-173947 | 6/1998 |
| JP | 2002-223366 | 8/2002 |
| JP | 2004-072760 A | 3/2004 |
| JP | 2004-112694 | 4/2004 |
| JP | 2004-192614 A | 7/2004 |
| JP | 2004-254303 | 9/2004 |
| JP | 2004-320723 | 11/2004 |
| JP | 2005-197996 | 7/2005 |
| JP | 2005-354314 | 12/2005 |
| JP | 2006-80746 | 3/2006 |
| JP | 2006-261879 A | 9/2006 |
| JP | 2006-303708 | 11/2006 |
| JP | 2007-228322 | 9/2007 |
| JP | 2008-171062 | 7/2008 |
| JP | 2009-016962 | 1/2009 |
| WO | WO 2007/010749 A1 | 1/2007 |

OTHER PUBLICATIONS

Japanese Office Action dated Dec. 14, 2010 together with English translation from Japanese patent application 2008-327428 (U.S. Appl. No. 12/647,164).

Japanese Official Action dated Jan. 4, 2011 together with English language translation from Japanese patent application 2008-330453 (U.S. Appl. No. 12/647,161).

Japanese Office Action dated Mar. 22, 2011 together with English translation from Japanese patent application 2008-327428 (U.S. Appl. No. 12/647,164).

Japanese Office Action dated Feb. 8, 2011 together with English translation from Japanese patent application 2008-327427 (U.S. Appl. No. 12/647,182).

Japanese Office Action dated Nov. 9, 2010, together with English translation.

Japanese Office Action dated Dec. 14, 2010, together with English translation.

United States Office Action dated Dec. 26, 2012 from related application U.S. Appl. No. 12/647,182.

* cited by examiner (OR, OG, OB) = Pixel Value of Pixel to be Corrected
(MR, MG, MB) = Pixel Value of Corrected Pixel
Ov = Largest Value in OR, OG, OB $$MR = OR + \left(\frac{(Swr - Owr) \times Ov}{255}\right)$$

$$MG = OG + \left(\frac{(Swg - Owg) \times Ov}{255}\right)$$

$$MB = OB + \left(\frac{(Swb - Owb) \times Ov}{255}\right)$$

FIG. 7

RGB → HSV Transformation (a) max (a, b, c) = Largest Value in a, b, c
min (a, b, c) = Smallest Value in a, b, c
(R, G, B) = Pixel Value of Pixel to be Transformed in RGB Image Data
(H, S, V) = Pixel Value of Transformed Pixel (b) V = max (R/255, G/255, B/255)

(c) V ≠ 0 → S = (V−min(R, G, B)) ÷ V
V = 0 → S = 0

(d) (V − min(R, G, B)) ≠ 0
r = (V−R/255) ÷ (V−min(R, G, B))
g = (V−G/255) ÷ (V−min(R, G, B))
b = (V−B/255) ÷ (V−min(R, G, B))
(V−min(R, G, B)) = 0
r = 0, g = 0, b = 0

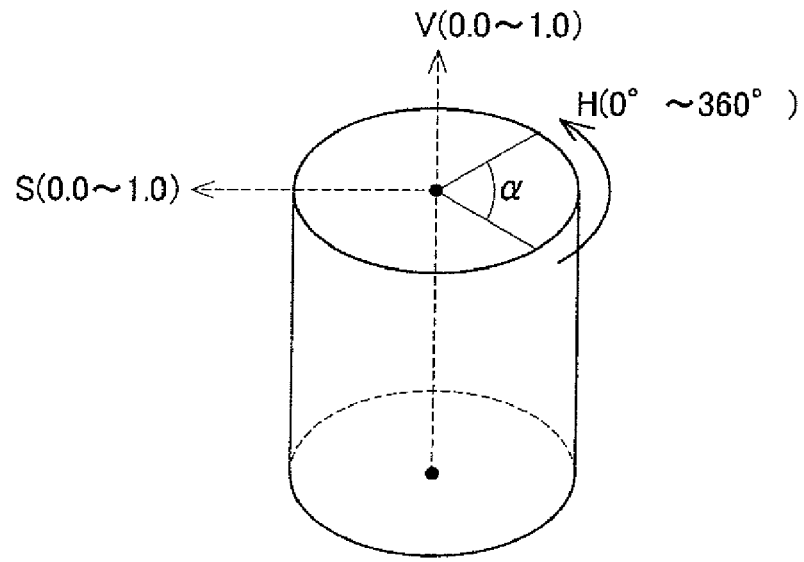

(MH, MS, MV) = Pixel Value of Pixel to be Corrected
(NH, NS, NV) = Pixel Value of Corrected Pixel
NH = MH
NS = MS
$NV = MV \times \dfrac{Svp}{Ovp}$  (MV≤Ovp)
$NV = (MV-1.0) \times \left(\dfrac{1.0-Svp}{1.0-Ovp}\right) + 1.0$  (MV>Ovp)

FIG. 11

HSV → RGB Transformation (a)  in = Integer Portion of H/60
    fl = Fractional Portion of H/60

(b)  in = Even Number → fl = 1−fl (c)  m = V × (1−S), n = V × (1−S × fl)

(d)  in = 0
    R = V × 255
    G = n × 255
    B = m × 255 in = 3
    R = m × 255
    G = n × 255
    B = V × 255 in = 1
    R = n × 255
    G = V × 255
    B = m × 255 in = 4
    R = n × 255
    G = m × 255
    B = V × 255 in = 2
    R = m × 255
    G = V × 255
    B = n × 255 in = 5
    R = V × 255
    G = m × 255
    B = n × 255

IMAGE PROCESSING DEVICE

CROSS-REFERENCE TO RELATED APPLICATIONS

This application claims priority to Japanese Patent Application No. 2008-330453, filed on Dec. 25, 2008, the contents of which are hereby incorporated by reference into the present application.

TECHNICAL FIELD

The present description discloses image processing technology for correcting object image data by utilizing base image data.

DESCRIPTION OF RELATED ART

There is a conventional technology for correcting object image data by utilizing base image data. With this technology, image processing parameters are determined according to the tendency of image reproduction (for example, hue such as skin color, blue, and green) of the base image data, and object image data is corrected based on the image processing parameters.

SUMMARY

The inventor of this application is engaged in the development of techniques for correcting a white balance of object image data that is the object of correction. This correction is performed so that the white balance of the object image data becomes similar to a white balance of base image data. In the present specification, a technology is provided that makes it possible to correct adequately the white balance of the object image data so as to approach the white balance of the base image data.

The inventor has discovered that pixels, which are a part of entire pixels of image data, having a higher brightness value among the entire pixels are an area that reflects a white balance (that is, color of ambient light) of the image data. In view of this, the inventor has created a novel method by which a value of each pixel in object image data is corrected so that a first representative value which represents an area (pixels) that reflects a white balance of the object image data approaches a second representative value which represents an area (pixels) that reflects a white balance of base image data. By using this method, it is possible to adequately correct the white balance of the object image data to resemble the white balance of the base image data. The techniques disclosed in the present specification have been created in view of the foregoing, and can be represented as follows.

One aspect of techniques disclosed in the present specification is an image processing device for creating first corrected image data by correcting object image data utilizing base image data. The image processing device may comprise a first determination unit, a second determination unit, and a first correction unit. The first determination unit may be configured to determine a first representative value which represents first pixels having a higher brightness value among entire pixels of the object image data. The first pixels may be a part of the entire pixels of the object image data. The second determination unit may be configured to determine a second representative value which represents second pixels having a higher brightness value among entire pixels of the base image data. The second pixels may be a part of the entire pixels of the base image data. The first correction unit may be configured to create the first corrected image data by correcting a value of each pixel of the object image data such that the first representative value approaches the second representative value.

An expression "first pixels having a higher brightness value" may be changed into, for example, but not limited to, "first pixels have a higher brightness value than other pixels in object image data". An expression "second pixels having a higher brightness value" may be changed into, for example, but not limited to, "second pixels have a higher brightness value than other pixels in base image data". Ways in which "first pixels" and "second pixels" are specified from the object image data and base image data are not particularly limited. For example, a method may be adopted that specifies a brightness value of each of all of the pixels in the object image data (or base image data), and specifies pixels that have higher brightness values from among the specified brightness values (for example, may specify the pixels in a descending order of brightness value). Upon so doing, a number of pixels that have to be specified may be determined in advance, or may be determined on a basis of the number of the entire pixels in the object image data (or base image data). Further, for example, a method may be adopted that specifies pixels having a brightness value higher than a predetermined value that has been set in advance from among the entire pixels in the object image data (or base image data).

Further, "each pixel of the object image" that is to be corrected may be all pixels in the object image data or may be a part of the pixels in the object image data. Thus, the correction may be performed with respect to all pixels in the object image data, or may be performed with respect to a part of the pixels in the object image data. Further, an expression "correcting a value of each pixel of the object image data such that the first representative value approaches the second representative value" may be changed into, for example, but not limited to, "correcting a value of each pixel of the object image based on a correction vector such that the first representative value approaches the second representative value".

BRIEF DESCRIPTION OF DRAWINGS

FIG. 7 shows mathematical formulas for transforming from RGB to HSV.

FIG. 8 shows an HSV color space.

FIG. 11 shows mathematical formulas for transforming from HSV to RGB.

DETAILED DESCRIPTION OF THE PREFERRED EMBODIMENT

Figure 1:
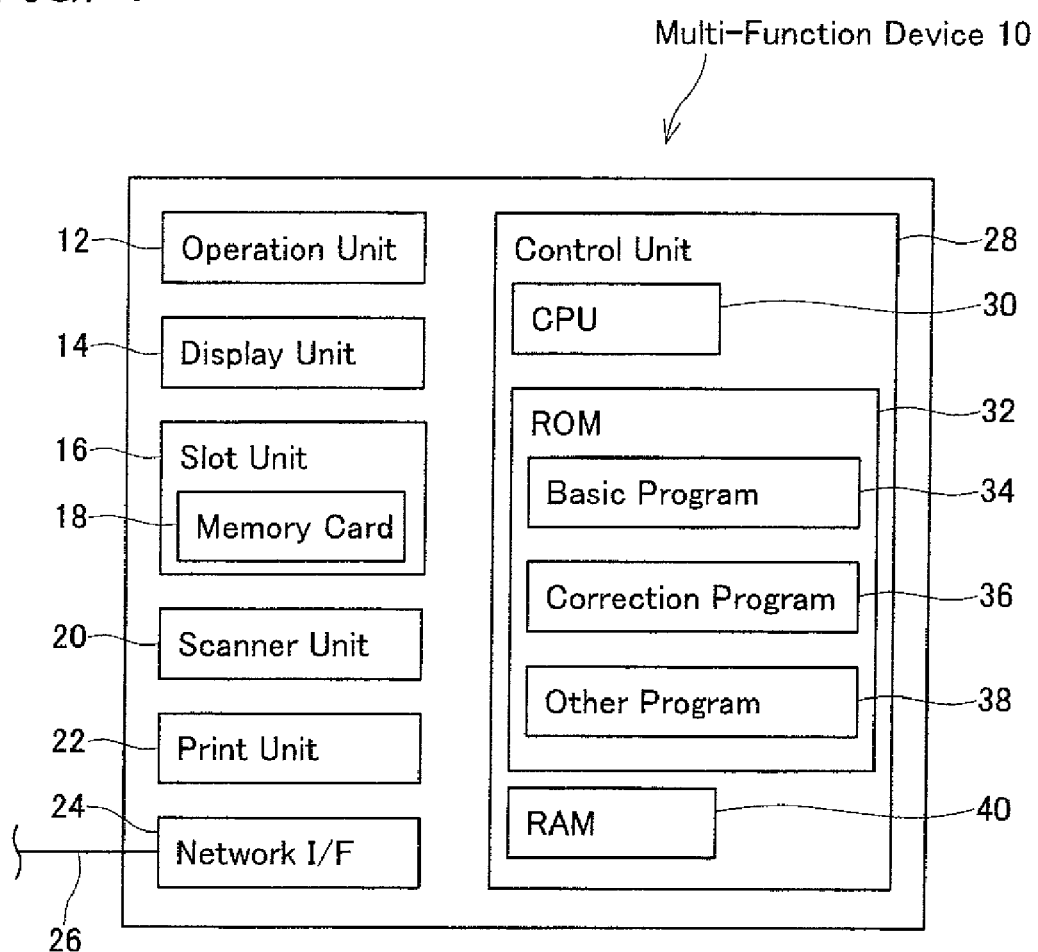
FIG. 1 shows a schematic configuration of a multi-function device.

An embodiment will be explained below with reference to the appended drawings. As shown in FIG. 1, a multi-function device 10 has an operation unit 12, a display unit 14, a slot unit 16, a scanner unit 20, a print unit 22, a network I/F 24, and a control unit 28. The operation unit 12 is constituted by a plurality of keys. A user can input various instructions and commands to the multi-function device 10 by operating the operation unit 12. The display unit 14 can display various kinds of information. The slot unit 16 has a space for accommodating a memory card 18. The user can insert the memory card 18 that stores image data into the slot unit 16. In the present embodiment, the image data stored in the memory card 18 is image data of an RGB format.

The scanner unit 20 has a scan mechanism such as CCD or CIS. The scanner unit 20 can generate image data by color scanning a document, a photograph, or the like. In the present embodiment, the image data generated by the scanner unit 20 is image data of an RGB format. The print unit 22 has a print mechanism of an ink jet type, a laser type, or the like. The print unit 22 can conduct printing on the basis of image data stored in the memory card 18 or image data generated by the scanner unit 20. Further, the print unit 22 can conduct printing on the basis of data inputted to the network I/F 24. The network I/F 24 is connected to a LAN 26.

The control unit 28 has a CPU 30, a ROM 32, and a RAM 40. The CPU 30 executes processing of various types according to programs 34 to 38 stored in the ROM 32. The ROM 32 stores various programs 34 to 38. A basic program 34 is a program for controlling basic operation of the multi-function device 10. The basic program 34 includes e.g., a program for generating data to be displayed on the display unit 14. Further, the basic program 34 includes e.g., a program for controlling the scanner unit 20, the print unit 22, and the like. A correction program 36 is a program for correcting the image data. The contents of processing executed by the CPU 30 according to the correction program 36 will be described below in greater detail. A program 38 is a program other than the programs 34 and 36. The RAM 40 can temporarily store the data generated in the process in which the CPU 30 executes the processing.

The multi-function device 10 of the present embodiment can correct image data stored in the memory card 18 (image data selected by the user) by using image data created by a scanner unit 20. More specifically, the multi-function device 10 can correct the image data stored in the memory card 18 such that a white balance of this image data approaches a white balance of image data generated by the scanner unit 20. Furthermore, the multi-function device 10 can correct brightness of the image data in which the white balance has been corrected.

Figure 2:
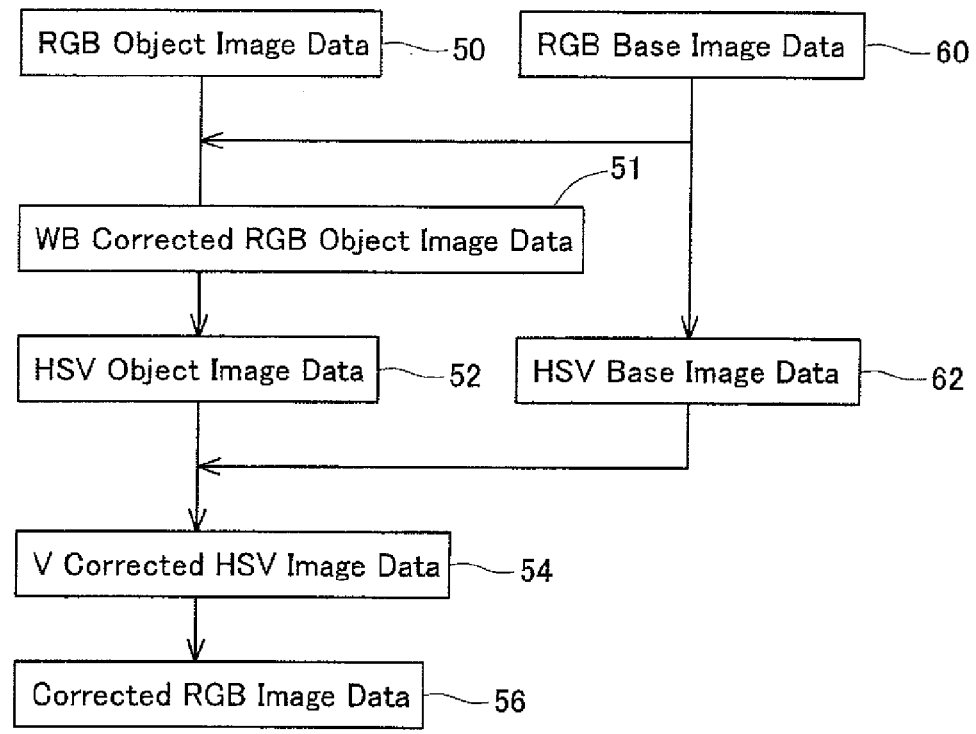
FIG. 2 shows schematically how image data is corrected.

The image data that is the object of correction (image data stored in the memory card 18) will be referred to hereinbelow as "RGB object image data". The image data that is used as a reference base for correction (image data generated by the scanner unit 20) will be referred to hereinbelow as "RGB base image data". The processing will be described below in greater detail. Here, the procedure of correcting the RGB object image data 50 will be explained in a simple manner using FIG. 2.

The RGB object image data 50 and RGB base image data 60 have a plurality of pixels. A value of each pixel is specified by a value in a color space of a three-dimensional orthogonal coordinate system (also referred to hereinbelow as "the RGB color space"). More specifically, the value of each pixel is specified by a value indicating R (red) (0 to 255), a value indicating G (green) (0 to 255), and a value indicating B (blue) (0 to 255). The multi-function device 10 uses the RGB base image data 60 to correct the white balance of the RGB object image data 50 by executing the below-described processes. As a result, corrected image data 51 is created. The image data 51 will be referred to hereinbelow as "WB cor-rected RGB object image data 51". A value of each pixel of the WB corrected RGB object image data 51 is specified by a value in the RGB color space.

The multi-function device 10 transforms the WB corrected RGB object image data 51 into image data 52 in the HSV format. The image data 52 will be referred to hereinbelow as "HSV object image data 52". The multi-function device 10 creates the HSV object image data 52 by transforming a value (orthogonal coordinate value) of each pixel constituting the WB corrected RGB object image data 51 to a polar coordinate value. Therefore, the number of pixels of the HSV object image data 52 is equal to the number of pixels of the WB corrected RGB object image data 51. The value of each pixel of the HSV object image data 52 is specified by a value in a color space (referred to hereinbelow as "HSV color space") of a cylindrical polar coordinate system. More specifically, the value of each pixel is specified by a value indicating a hue (H) (0 to 360°), a value indicating a saturation (S) (0 to 1.0), and a value indicating a brightness (V) (0 to 1.0). Generally, V of HSV means "value", however "brightness" is utilized instead of "value" in the present specification.

The multi-function device 10 transforms the RGB base image data 60 into image data 62 in the HSV format similarly as the above-described technique of transforming the WB corrected RGB object image data 51 into the HSV object image data 52. The image data 62 will be referred to hereinbelow as "HSV base image data 62". The value of each pixel of the HSV base image data 62 is specified by a value in the HSV color space.

The multi-function device 10 uses the HSV base image data 62 to correct the brightness of the HSV object image data 52 by executing the below-described processes. As a result, corrected image data 54 is created. The image data 54 will be referred to hereinbelow as "V corrected HSV image data 54". The value of each pixel of the V corrected HSV image data 54 is specified by a value in the HSV color space. Further, the multi-function device 10 transforms the V corrected HSV image data 54 into image data 56 in the RGB format. The image data 56 will be referred to hereinbelow as "corrected RGB image data 56". The value of each pixel of the corrected RGB image data 56 is specified by a value in the RGB color space.

Figure 3:
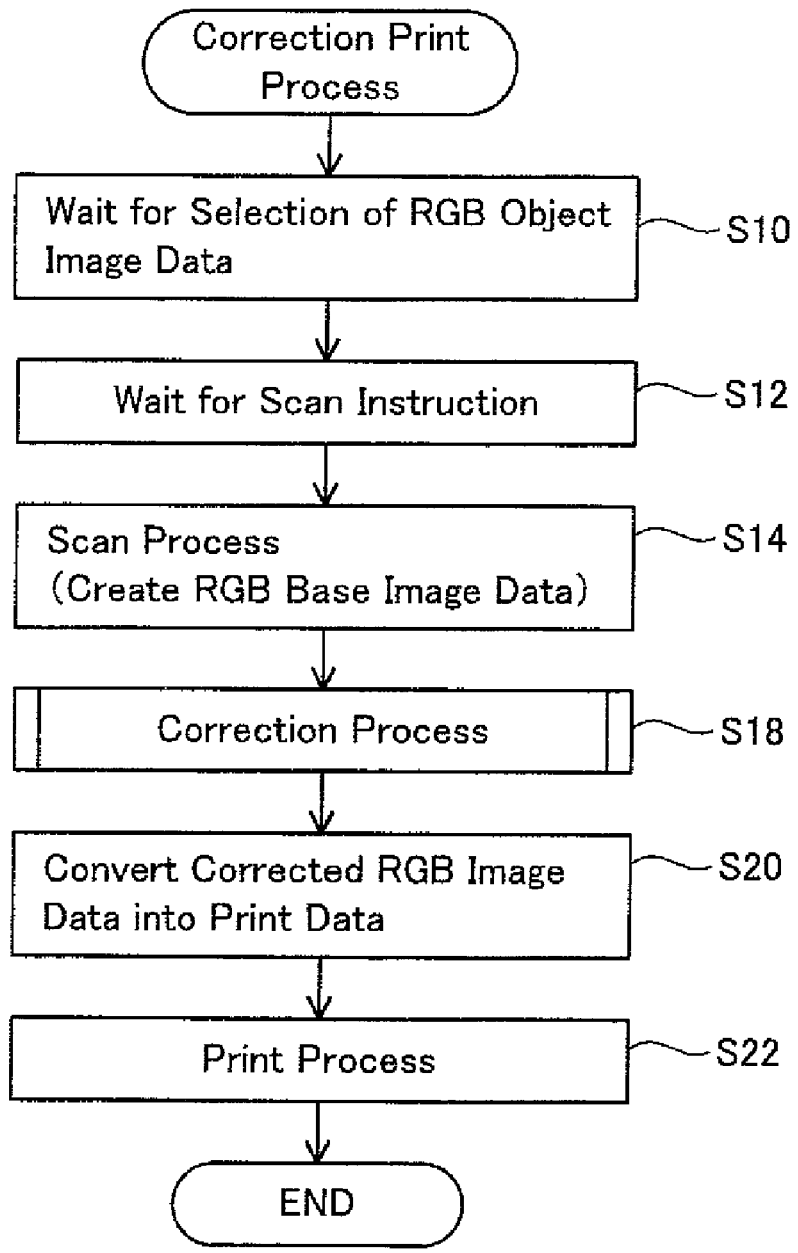
FIG. 3 is a flowchart of correction print process.

The contents of a correction print process executed by the multi-function device 10 will be described below in greater detail using FIG. 3. The user can select a correction print mode by operating the operation unit 12. In a case where such an operation is performed, the correction printing process is executed. The correction print process is executed by the CPU 30 according to the basic program 34 and the correction program 36. In the flowchart in FIG. 3, a process of S18 is executed according to the correction program 36, and the other processes are executed according to the basic program 34.

The user can select one image data from among a plurality of image data stored in the memory card 18 by operating the operation unit 12. The selected image data becomes the image data that is the object of correction (i.e., the RGB object image data 50). The CPU 30 stands by until the RGB object image data 50 is selected (S10).

The user can cause the scanner unit 20 to scan base image (e.g., a photograph) that is to be used for correcting the RGB object image data 50 by operating the operation unit 12. The CPU 30 stands by until this operation is executed (S12). Where this operation is executed by the user, the CPU 30 causes the scanner unit 20 to conduct scanning (S14). As a result, the scanner unit 20 color-scans the base image selected by the user, thereby generating the image data (i.e., the RGB base image data 60).

The CPU 30 then executes a correction process (S18). The contents of the correction process will be described below in greater detail. The corrected RGB image data 56 is obtained by the correction process. The CPU 30 converts the corrected RGB image data 56 into printing data (CMYK-format bitmap data) (S20). Then, the CPU 30 causes the print unit 22 to conduct printing based on the printing data generated in S20 (S22). As a result, the print unit 22 conducts printing on a printing medium on the basis of the printing data. The user can thus obtain the printing medium with an image corresponding to the corrected RGB image data 56.

Figure 4:
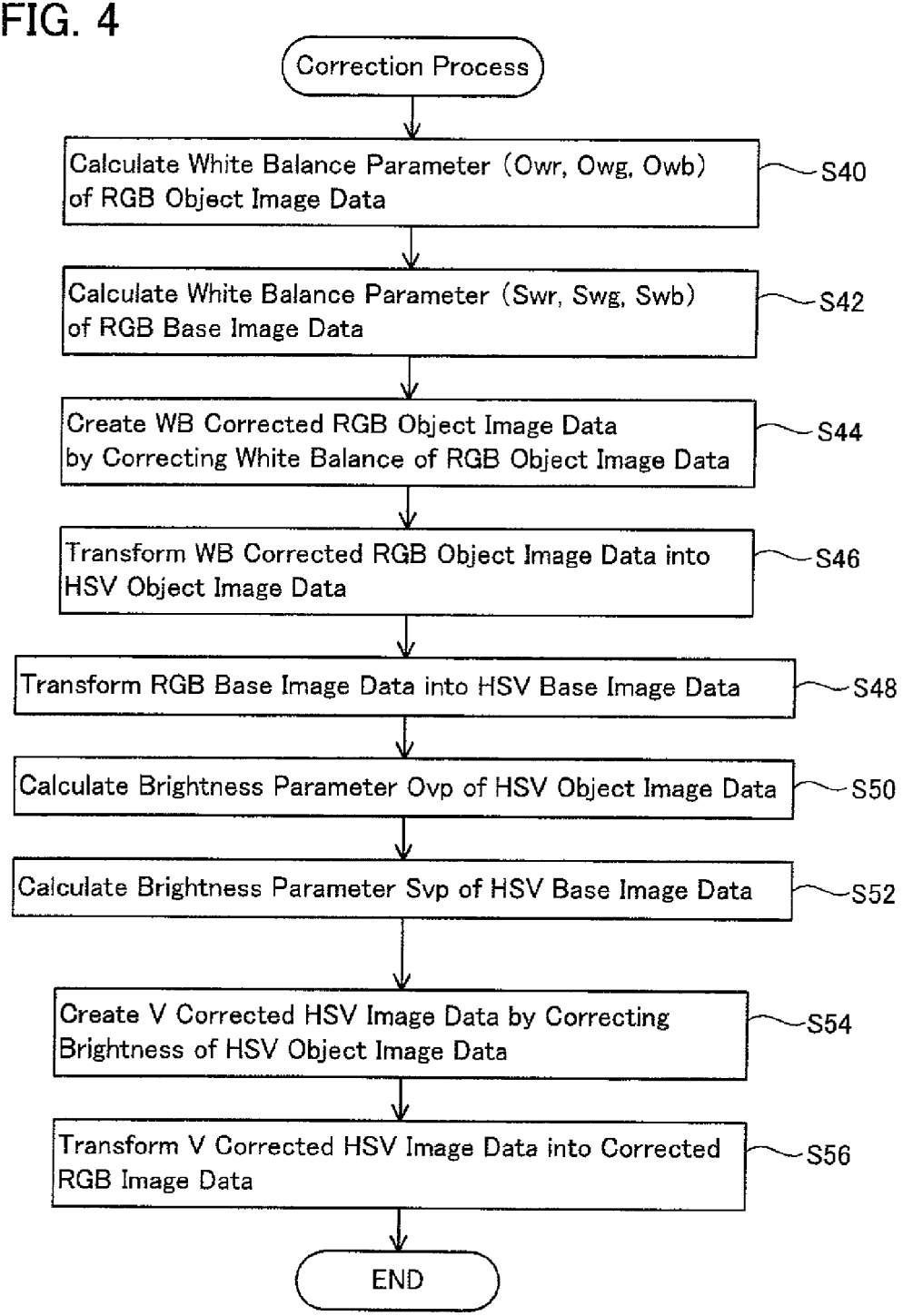
FIG. 4 is a flowchart of correction process.

The contents of the correction process executed in S18 will be described below in greater detail. FIG. 4 is a flowchart of the correction process. The CPU 30 calculates a white balance parameter (Owr, Owg, Owb) of the RGB object image data 50 (S40). First, the CPU 30 specifies, for each of entire pixels of the RGB object image data 50, a brightness value of the pixel. In the present embodiment, a brightness value of a pixel is the largest value from among R, G, and B of the pixel. For example, in a case where a pixel in which R is 100, G is 20, and B is 200 is present, the brightness value of the pixel is 200. The CPU 30 then specifies a pixel having the largest brightness value from among the entire pixels of the RGB object image data 50. The CPU 30 then specifies a pixel with the next largest brightness value. The CPU 30 repeats this process. The CPU 30 repeats the above-described process till the number of specified pixels becomes 20 percent of the number of the entire pixels of the RGB object image data 50. As a result, the pixels of the upper 20 percent in terms of the brightness value are specified from the RGB object image data 50. For example, in a case where 10,000 pixels are present in the RGB object image data 50, a total of 2000 pixels with a large brightness value are specified. The CPU 30 calculates Owr by calculating an average value of R of the specified pixels. The CPU 30 calculates Owg by calculating an average value of G of the specified pixels. Further, the CPU 30 calculates Owb by calculating an average value of B of the specified pixels. As a result, the white balance parameter (Owr, Owg, Owb) of the RGB object image data 50 is obtained.

The CPU 30 then calculates a white balance parameter (Swr, Swg, Swb) of the RGB base image data 60 (S42). The process of S42 is executed similarly as the process of S40. Thus, the CPU 30 specifies pixels of the upper 20 percent in terms of the brightness value from the RGB base image data 60. Then, the CPU 30 calculates Swr, Swg, and Swb by calculating an average value of each of R, G, and B of the specified pixels. As a result, the white balance parameter (Swr, Swg, Swb) of the RGB base image data 60 is obtained.

Figures 5, 6:
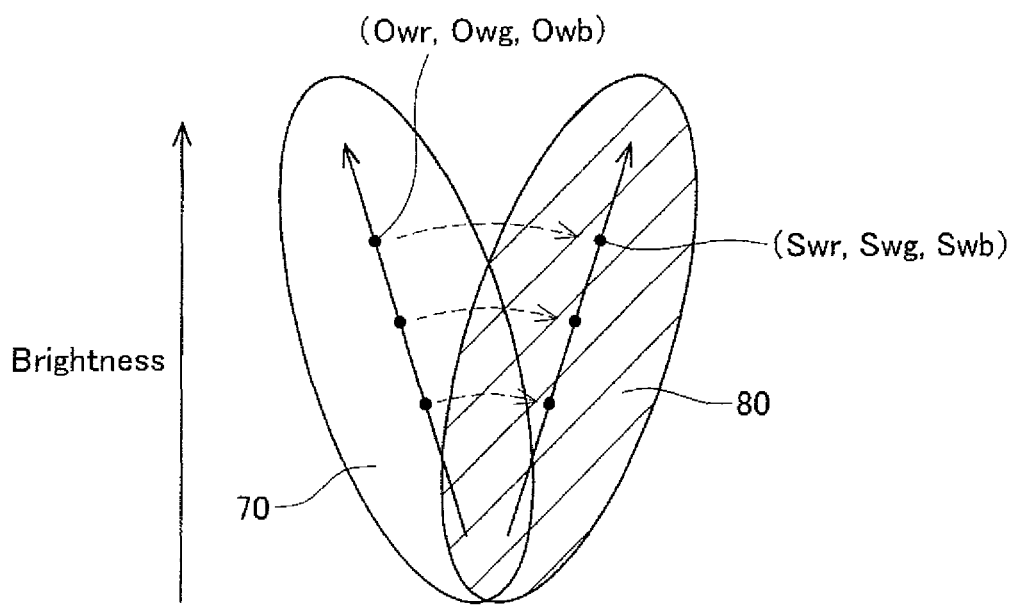
FIG. 5 shows mathematical formulas for correcting a white balance.
FIG. 6 shows schematically how the white balance is corrected.

The CPU 30 then creates the WB corrected RGB object image data 51 by correcting the white balance of the RGB object image data 50 (S44). The correction process of S44 is executed in the RGB color space. First, the CPU 30 selects one pixel in the RGB object image data 50. A coordinate value of the selected pixel (can be also referred to hereinbelow as "pixel value") is specified by (OR, OG, OB). FIG. 5 shows mathematical formulas for correcting the coordinate value (OR, OG, OB). In FIG. 5, a corrected coordinate value is specified by (MR, MG, MB). The CPU 30 specifies the largest value from among OR, OG, and OB as Ov. As shown in FIG. 5, the CPU 30 corrects the coordinate value (OR, OG, OB) by using the Ov. The mathematical formula shown in FIG. 5 uses a correction vector (Swr−Owr, Swg−Owg, Swb−Owb) obtained by subtracting the white balance parameter (Owr, Owg, Owb) of the RGB object image data 50 from the white balance parameter (Swr, Swg, Swb) of the RGB base image data 60. Thus, the correction vector is used such that the white balance parameter (Owr, Owg, Owb) approaches the white balance parameter (Swr, Swg, Swb). The CPU 30 calculates the corrected coordinate value (MR, MG, MB) by the mathematical formulas shown in FIG. 5.

As described hereinabove, the CPU 30 corrects the coordinate value (OR, OG, OB) of the pixel (correction target pixel) by using the Ov specified from the coordinate value (OR, OG, OB) of the correction target pixel. Thus, the CPU 30 determines a correction amount for the coordinate value (OR, OG, OB) of the correction target pixel in accordance with the coordinate value (OR, OG, OB) thereof. FIG. 6 shows schematically how the correction is performed by the mathematical formulas shown in FIG. 5. Three points on an arrow on the left side indicate the coordinate value (OR, OG, OB) before the correction. The coordinate value (MR, MG, MB) after each of the three points has been corrected is shown as three points on an arrow on the right side. As the brightness value (that is, the aforementioned Ov) of the correction target pixel increases (moves upward in FIG. 6), the correction amount for the correction target pixel increases. The area 70 on the left side can be called an image color distribution 70 before the correction, and an area 80 on the right side (the area shown by hatching) can be called an image color distribution 80 after the correction.

The CPU 30 calculates the corrected coordinate value (MR, MG, MB) by the mathematical formulas shown in FIG. 5 with respect to each of all other pixels of the RGB object image data 50. As a result, the WB corrected RGB object image data 51 is obtained.

The CPU 30 then transforms the WB corrected RGB object image data 51 into the HSV object image data 52 (S46). FIG. 7 shows mathematical formulas for transforming a coordinate value in the RGB color space into a coordinate value in the HSV color space. The CPU 30 selects one pixel (transformation target pixel) constituting the WB corrected RGB object image data 51. As shown in FIG. 7(a), a coordinate value of the transformation target pixel is specified as (R, G, B) and a coordinate value in the HSV color space that is obtained by transformation from the coordinate value of the transformation target pixel is specified as (H, S, V). As shown in FIG. 7(b), the CPU 30 calculates R/255, G/255, and B/255 and specifies the largest value among them as V. Further, the CPU 30 calculates S by the mathematical formulas shown in FIG. 7(c). The CPU 30 then calculates intervening variables r, g, b by the mathematical formulas shown in FIG. 7(d). The CPU 30 calculates H by the mathematical formulas shown in FIG. 7(e). Where the H calculated herein has a negative value, the CPU 30 calculates a new H by adding 360 to the H having the negative value, as shown in FIG. 7(f). As a result, the coordinate value (H, S, V) in the HSV color space can be obtained from the coordinate value (R, G, B) of the transformation target pixel.

As clearly shown in FIG. 8, the HSV color space is a color space in a cylindrical coordinate system. H that indicates a hue has any value from 0 to 360°. S that indicates a saturation has any value from 0 to 1.0. V that indicates a brightness has any value from 0 to 1.0.

The CPU 30 calculates, for each of a rest of pixels of the WB corrected RGB object image data 51, a coordinate value (H, S, V) in the HSV color space by the mathematical formulas shown in FIG. 7(a) to FIG. 7(f). As a result, the HSV object image data 52 is obtained.

The CPU 30 then transforms the RGB base image data 60 into the HSV base image data 62 (S48). The process of S48 is conducted by a method similar to that of the processing of the above-described S46. Thus, the CPU 30 calculates, for each of all pixels of the RGB base image data 60, a coordinate value (H, S, V) in the HSV color space by the mathematical formulas shown in FIG. 7(a) to FIG. 7(f). As a result, the HSV base image data 62 is obtained.

The CPU 30 then calculates a brightness parameter Ovp of the HSV object image data 52 (S50). More specifically, the CPU 30 calculates an average value of V (that is, value indicating a brightness) of each pixel of the HSV object image data 52. As a result, the brightness parameter Ovp of the HSV object image data 52 is obtained. The CPU 30 calculates a brightness parameter Svp of the HSV base image data 62 by using a technique similar to that of S50 (S52). Thus, the CPU 30 calculates an average value of V of each pixel of the HSV base image data 62. As a result, the brightness parameter Svp of the HSV base image data 62 is obtained.

Figures 9, 10:
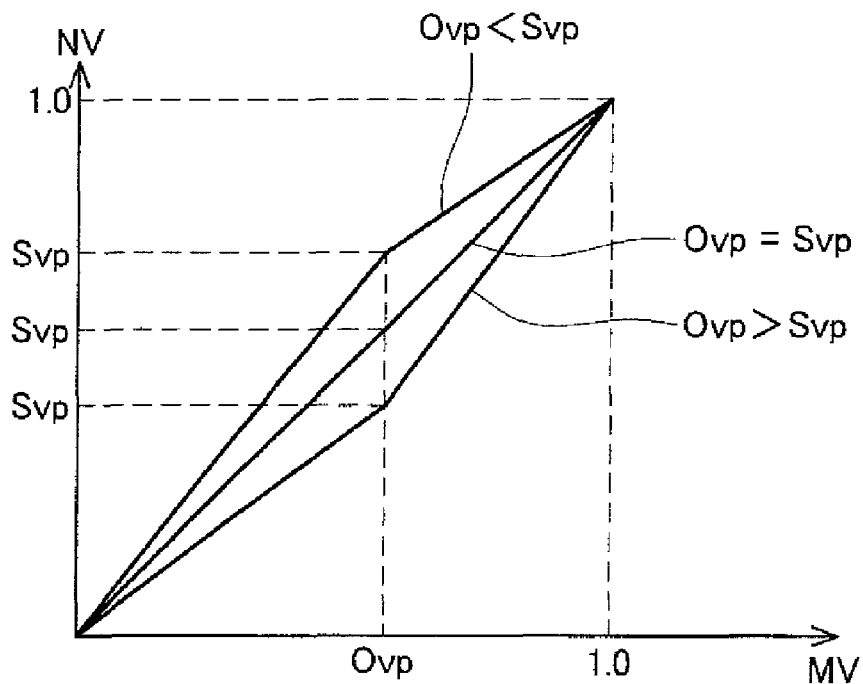
FIG. 9 shows mathematical formulas for correcting brightness.
FIG. 10 shows a graph in which the abscissa corresponds to MV and the ordinate corresponds to NV.

The CPU 30 then creates V corrected HSV image data 54 by correcting the brightness of each pixel of the HSV object image data 52 (S54). The correction process of S54 is executed in the HSV color space. FIG. 9 shows mathematical formulas for correcting the brightness. The CPU 30 selects one pixel (correction target pixel) constituting the HSV object image data 52. As shown in FIG. 9, a coordinate value of the correction target pixel is specified as (MH, MS, MV), and a coordinate value in the HSV color space after the aforementioned coordinate value has been corrected is specified as (NH, NS, NV). The CPU 30 determines MH as NH, and determines MS as NS. Thus, MH that indicates a hue and MS that indicates a saturation in the coordinate value (MH, MS, MV) of the correction target pixel are not corrected. The CPU 30 uses the brightness parameters Ovp and Svp obtained in S50 and S52 to calculate NH by the mathematical formulas shown in FIG. 9. As a result, a corrected coordinate value (NH, NS, NV) is obtained.

FIG. 10 shows a graph in which MV is plotted relative to the abscissa and NV is plotted relative to the ordinate. In a case where the brightness parameter Ovp is equal to the brightness parameter Svp, MV becomes equal to NV. In a case where the brightness parameter Ovp is greater than the brightness parameter Svp, the lowermost graph in FIG. 10 is obtained. In this graph, where MV is less than the brightness parameter Ovp, NV becomes a value obtained by multiplying a ratio of the brightness parameter Svp and the brightness parameter Ovp (that is, a slope Svp/Ovp) by MV. In this graph, the slope NV/MV is greater in a case where MV is greater than the brightness parameter Ovp than in a case where MV is less than the brightness parameter Ovp. In a case where the brightness parameter Ovp is less than the brightness parameter Svp, the uppermost graph in FIG. 10 is obtained. In this graph, in a case where MV is less than the brightness parameter Ovp, NV becomes a value obtained by multiplying a ratio of the brightness parameter Svp and the brightness parameter Ovp (that is, a slope Svp/Ovp) by MV. In this graph, the slope NV/MV is smaller in a case where MV is greater than the brightness parameter Ovp than in a case where MV is less than the brightness parameter Ovp.

The CPU 30 calculates, for each of the other pixels of the HSV object image data 52, a corrected coordinate value (NH, NS, NV) by the mathematical formulas shown in FIG. 9. As a result, V corrected HSV image data 54 is obtained.

Then, the CPU 30 transforms the V corrected HSV image data 54 into corrected RGB image data 56 (S56). FIG. 11 shows mathematical formulas for transforming a coordinate value in the HSV color space into a coordinate value in the RGB color space. The CPU 30 selects one pixel (transformation target pixel) constituting the V corrected HSV image data 54. In FIG. 11, a coordinate value of the transformation target pixel is specified as (H, S, V), and a coordinate value in the RGB that is obtained by transformation from the coordinate value of the transformation target pixel is specified as (R, G, B). As shown in FIG. 11(a), the CPU 30 calculates intervening variables "in" and "fl" from H of the coordinate value of the transformation target pixel. As shown in FIG. 11(b), when the intervening variable "in" is an even number, the CPU 30 subtracts "fl" from 1 (one) and calculates new "fl". Then, the CPU 30 calculates intervening variables "m" and "n" from S and V of the coordinate value of the transformation target pixel by the mathematical formulas shown in FIG. 11(c). The CPU 30 calculates R, G, and B from V, "m", and "n" by the mathematical formulas shown in FIG. 11(d). As a result, a coordinate value (R, G, B) in the RGB color space is obtained.

The CPU 30 calculates, for each of the other pixels of the V corrected HSV image data 54, the coordinate value (R, G, B) in the RGB color space by the mathematical formulas shown in FIG. 11. As a result, the corrected RGB image data 56 is obtained.

The multi-function device 10 of the present embodiment has been explained above in detail. The multi-function device 10 calculates the white balance parameter (Owr, Owg, Owb) from the area (part of pixels with a large brightness value) that reflects (dominates) the white balance of the RGB object image data 50, and calculates the white balance parameter (Swr, Swg, Swb) from the area (part of pixels with a large brightness value) that reflects (dominates) the white balance of the RGB base image data 60. The multi-function device 10 corrects the value of each pixel of the RGB object image data 50 by using a correction vector such that the white balance parameter (Owr, Owg, Owb) approaches the white balance parameter (Swr, Swg, Swb). As a result, the white balance of the RGB object image data 50 can be adequately corrected so as to approach the white balance of the RGB base image data 60. In particular, in the present embodiment, the user can designate an image that has a white balance preferred by the user as the RGB base image data 60. That is, the multi-function device 10 is provided with a unit configured to allow the user to designate the RGB base image data 60. With such a configuration, the white balance of the RGB object image data 50 can be adequately corrected so that it approaches the white balance preferred by the user.

The multi-function device 10 corrects not only the white balance, but also the brightness of the WB corrected RGB object image data 51 (HSV object image data 52) so that it approaches the brightness of the RGB base image data 60 (HSV base image data 62). The visible appearance of the corrected RGB image data 56 can be made more similar to the visible appearance of the RGB base image data 60.

The multi-function device 10 is an example of "an image processing device". The RGB object image data 50, RGB base image data 60, WB corrected RGB object image data 51, and V corrected HSV image data 54 are examples of "object image data", "base image data", "first corrected image data", and "second corrected image data", respectively. The white balance parameter (Owr, Owg, Owb) and white balance parameter (Swr, Swg, Swb) are examples of "a first representative value" and "a second representative value", respectively. The process of S40, process of S42, and process of S44 in FIG. 4 are examples of a process executed by "a first determination unit", "a second determination unit", and "a first correction unit", respectively. The brightness parameter Ovp and brightness parameter Svp are examples of "a first brightness value" and "a second brightness value", respectively. The process of S50, process of S52, and process of S54 in FIG. 4 are examples of a process executed by "a third determination unit", "a fourth determination unit", and "a second correction unit". The HSV color space is an example of "a particular color space".

The above-described embodiment is an illustrative example. A variety of changes can be introduced in the above-described embodiment. The variation examples of the embodiment will be described below.

(1) In the above-described embodiment, the multi-function device 10 initially corrects the white balance of the RGB object image data 50 and then corrects the brightness. However, the multi-function device 10 may also initially correct the brightness of the RGB object image data 50 and then correct the white balance. In this case, the multi-function device 10 may execute the following processing. The multi-function device 10 transforms the RGB object image data 50 into first HSV image data, and calculates a brightness parameter of the first HSV image data. The multi-function device 10 transforms the RGB base image data 60 into second HSV image data and calculates a brightness parameter of the second HSV image data. The multi-function device 10 uses the two brightness parameters, and creates V corrected HSV image data by correcting a coordinate values of each pixel of the first HSV image data in accordance with the mathematical formulas shown in FIG. 9. Then, the multi-function device 10 transforms the V corrected HSV image data into the V corrected RGB image data, and calculates a white balance parameter of the V corrected RGB image data. The multi-function device 10 then calculates a white balance parameter of the RGB base image data 60. The multi-function device 10 uses the two white balance parameters, and creates corrected RGB image data by correcting a coordinate value of each pixel of the V corrected RGB image data in accordance with the mathematical formulas shown in FIG. 5. In the present variation example, the aforementioned V corrected RGB image data is an example of "object image data".

(2) In the above-described embodiment, the multi-function device 10 specifies pixels of the upper 20 percent in terms of the brightness value from the RGB object image data 50 and RGB base image data 60, and calculates the white balance parameters (Owr, Owg, Owb) and (Swr, Swg, Swb) from the specified pixels. However, a technique for specifying the pixels may be changed. For example, the multi-function device 10 may calculate an average value of a brightness value of each of the entire pixels of the RGB object image data 50, and specify pixels that are grater than the average value (or a value that is set based on the average value). Further, the aforementioned ratio of 20 percent may be changed appropriately.

(3) In the above-described embodiment, image data stored in the memory card 18 is taken as the RGB object image data 50 that is the object of correction. However, other image data may be also taken as the RGB object image data 50. For example, image data generated by the scanner unit 20 may be also taken as the RGB object image data 50. Further, in the above-described embodiments, image data generated by the scanner unit 20 is taken as the RGB base image data 60. However, other image data may be also taken as the RGB base image data 60. For example, image data stored in the memory card 18 may be taken as the RGB base image data 60.

(4) In the above-described embodiment, a color space of a cylindrical coordinate system (HSV color space) is used as the color space of a polar coordinate system. However, a color space of a spherical coordinate system may be also used as the color space of the polar coordinate system. Further, it is not limited that the brightness of the WB corrected object image data 51 is corrected in the HSV color space. The correction may be performed in another color space such as a Lab color space.

(5) In the above-described embodiment, the largest value from among the R value, G value, and B value of a pixel is used as the brightness value of the pixel. Instead, a Y value represented by Y=0.299R+0.578G+0.114B may be used as the brightness value.

(6) The correction program 36 illustrated by FIG. 1 may or may not be installed in the multi-function device 10 at a stage of shipping the multi-function device 10. In the latter case, the correction program 36 may be downloaded into the multi-function device 10 from the Internet or may be installed in the multi-function device 10 from a computer readable medium. A computer readable medium that stores the correction program 36 is also a useful feature.

(7) The multi-function device 10 may correct each pixel of the RGB object image data 50 in a color space other than the RGB color space. For example, the multi-function device 10 may correct each pixel of the RGB object image data 50 in a color space of an orthogonal coordinate system other than the RGB color space. Further, for example, the multi-function device 10 may correct each pixel of the RGB object image data 50 in a color space of a polar coordinate system (for example, an HSV color space, a Lab color space, etc.).

(8) The brightness parameter Ovp and brightness parameter Svp may not be average values; for example, they may be central values.

What is claimed is:

1. An image processing device for creating first corrected image data by correcting object image data utilizing base image data, the image processing device comprising:
  a controller configured to operate as:
    a first determination unit configured to determine a first representative value which represents first pixels having a higher brightness value among entire pixels of the object image data, the first pixels being a part of the entire pixels of the object image data;
    a second determination unit configured to determine a second representative value which represents second pixels having a higher brightness value among entire pixels of the base image data, the second pixels being a part of the entire pixels of the base image data; and
    a first correction unit configured to create the first corrected image data by correcting a value of each pixel of the object image data such that the first representative value approaches the second representative value.

2. The image processing device as in claim 1, wherein the first correction unit is configured to determine, for the each pixel of the object image data, a correction amount for the pixel based on a value of the pixel.

3. The image processing device as in claim 1, wherein
  the first determination unit is configured to determine the first representative value which is a value in an RGB color space,
  the second determination unit is configured to determine the second representative value which is a value in the RGB color space, and
  the first correction unit is configured to correct the each pixel of the object image data in the RGB color space.

4. The image processing device as in claim 1, wherein:
  the controller is configured to further operate as:
    a third determination unit configured to determine a first brightness value related to a brightness of the first corrected image data;

a fourth determination unit configured to determine a second brightness value related to a brightness of the base image data; and a second correction unit configured to create second corrected image data by correcting a value of each pixel of the first corrected image data utilizing the first brightness value and the second brightness value.

5. The image processing device as in claim 4, wherein the second correction unit is configured to correct the value of the each pixel of the first corrected image data based on a ratio of the first brightness value and the second brightness value.

6. The image processing device as in claim 4, wherein
the third determination unit is configured to determine the first brightness value by calculating an average value of a brightness value of the each pixel of the first corrected image data, and
the fourth determination unit is configured to determine the second brightness value by calculating an average value of a brightness value of each pixel of the base image data.

7. The image processing device as in claim 4, wherein
the first brightness value is a coordinate value in a particular color space including an axis indicating a brightness,
the second brightness value is a coordinate value in the particular color space, and
the second correction unit is configured to correct the value of the each pixel of the first corrected image data in the particular color space.

8. A non-transitory computer readable medium including a computer program for creating corrected image data by correcting object image data utilizing base image data, the computer program including instructions for ordering a computer to perform:

determining a first representative value which represents first pixels having a higher brightness value among entire pixels of the object image data, the first pixels being a part of the entire pixels of the object image data;
determining a second representative value which represents second pixels having a higher brightness value among entire pixels of the base image data, the second pixels being a part of the entire pixels of the base image data; and
creating the corrected image data by correcting a value of each pixel of the object image data such that the first representative value approaches the second representative value.

9. An image processing method for creating first corrected image data by correcting object image data utilizing base image data, the image processing method comprising:

determining a first representative value which represents first pixels having a higher brightness value among entire pixels of the object image data, the first pixels being a part of the entire pixels of the object image data;
determining a second representative value which represents second pixels having a higher brightness value among entire pixels of the base image data, the second pixels being a part of the entire pixels of the base image data; and
creating the first corrected image data by correcting a value of each pixel of the object image data such that the first representative value approaches the second representative value.

* * * * *